US012437369B2

(12) United States Patent
Djelouah et al.

(10) Patent No.: US 12,437,369 B2
(45) Date of Patent: Oct. 7, 2025

(54) DEEP LEARNING FRAMEWORK FOR VIDEO REMASTERING

(71) Applicant: DISNEY ENTERPRISES, INC., Burbank, CA (US)

(72) Inventors: Abdelaziz Djelouah, Zurich (CH); Givi Meishvili, Bern (CH); Christopher Richard Schroers, Uster (CH); Shinobu Hattori, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 905 days.

(21) Appl. No.: 17/670,004

(22) Filed: Feb. 11, 2022

(65) Prior Publication Data

US 2023/0153952 A1 May 18, 2023

Related U.S. Application Data

(60) Provisional application No. 63/279,386, filed on Nov. 15, 2021.

(51) Int. Cl.
*G06T 5/70* (2024.01)
*G06T 3/4053* (2024.01)

(52) U.S. Cl.
CPC .............. *G06T 5/70* (2024.01); *G06T 3/4053* (2013.01); *G06T 2207/10016* (2013.01); *G06T 2207/20081* (2013.01)

(58) Field of Classification Search
CPC ................... G06T 5/70; G06T 3/4053; G06T 2207/10016; G06T 2207/20081
See application file for complete search history.

(56) References Cited

U.S. PATENT DOCUMENTS

2022/0392021 A1\* 12/2022 Sinha ..................... G06V 20/46
2023/0281777 A1\* 9/2023 Lenor ................... B60W 50/14
382/104

\* cited by examiner

*Primary Examiner* — David Perlman
(74) *Attorney, Agent, or Firm* — Farjami & Farjami LLP

(57) ABSTRACT

Restoration methods and systems are disclosed for video remastering. Techniques disclosed include receiving a video sequence. For each frame of the video sequence, techniques disclosed include encoding, by a degradation encoder, a video content associated with the frame into a latent vector. The latent vector is a representation of the degradation present in the video content; the degradation present in the video content includes one or more degradation types. Based on the latent vector and the video content, techniques disclosed further include generating, by a backbone network, one or more feature maps, and, then, restoring the frame based on the one or more feature maps.

22 Claims, 7 Drawing Sheets

100

200

300

400

600

700

DEEP LEARNING FRAMEWORK FOR VIDEO REMASTERING

CROSS REFERENCE TO RELATED APPLICATION

This application claims the benefit of U.S. Provisional Patent App. No. 63/279,386, filed Nov. 15, 2021, the disclosure of which is hereby incorporated by reference herein by its entirety.

BACKGROUND

Streaming services require expansive catalogs to be competitive. Old legacy films can enrich and supplement the content of such catalogs. However, the video content of legacy films is typically degraded—that is, video content, captured by low-resolution cameras, based on old sensor technologies, may be blurry, noisy, and scratched. To meet current expectations of quality and current streaming and display technologies, remastering (restoration) of these legacy films is required.

Current restoration techniques, based on deep learning technologies, provide tools that separately tackle video denoising or video upscaling. Such specialized tools can be applied sequentially to denoise and, then, to upscale a video into higher resolution, for example. However, applying independently optimized restoration tools, in a cascading manner, may lead to sub-optimal performance in terms of restoration quality and computational complexity. Thus, techniques that restore video content by jointly addressing different types of degradations are needed.

BRIEF DESCRIPTION OF THE DRAWINGS

A more detailed understanding may be had from the following description, given by way of example in conjunction with the accompanying drawings wherein.

DETAILED DESCRIPTION

Figure 1:
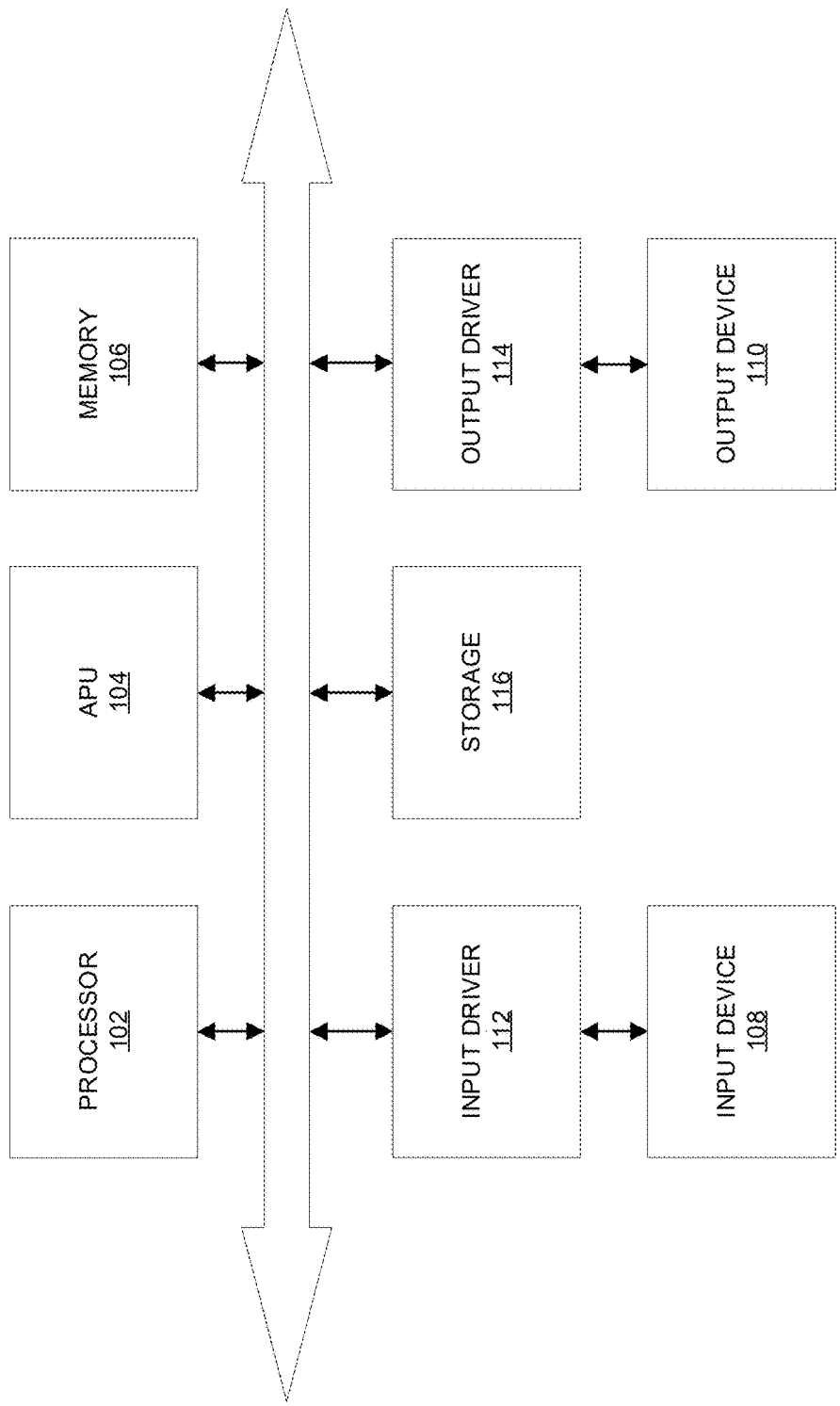
FIG. 1 is a block diagram of an example device, based on which one or more features of the disclosure can be implemented.

Systems and methods disclosed herein provide pipelined video processing that can enhance the quality of corrupted and low-resolution legacy films. Techniques disclosed herein restore an input video of a legacy film, including the removal of scratches, denoising, and upscaling the input video into higher resolution. Furthermore, techniques for manual refinement of the video restoration, for artistic tuning, are provided. To remove content degradation consisting of various types of degradations that may be present in a legacy film, aspects of the present disclosure include extracting a representation of the content degradation. Further aspects include manipulating the extracted degradation representation to artistically adjust the restored (output) video. The degradation representation may then be used for conditioning a backbone network that feeds restoration-specific networks, such as a denoising network and a super-resolution network.

Disclosed in the present application are video restoration models that jointly target common degradations that are typically present in legacy films. These video restoration models utilize a new contrastive training strategy to learn interpretable and controllable representations of different types of content degradation. Techniques disclosed herein employ contrastive learning to learn degradation representations (namely, latent vectors) in a discriminative representation space. Training of networks described herein is based on pairs of degraded video samples, forming positive, negative, and hard negative examples. Given a low-resolution corrupted input video, the remastering systems described herein produce a denoised low-resolution output video as well as a denoised high-resolution output video. The denoised high-resolution output video can be produced at any scale-a feature that is useful when the input video is to be restored to various video standards (e.g., NTSC).

Aspects disclosed herein describe methods for video remastering by a restoration system. The methods comprise receiving, by the system, a video sequence. For each frame of the video sequence, the methods further comprise encoding, by a degradation encoder, a video content associated with the frame into a latent vector. The latent vector is a representation of the degradation present in the video content; the degradation present in the video content includes one or more degradation types. Then, generating, by a backbone network, based on the latent vector and the video content, one or more feature maps, and, restoring, based on the one or more feature maps, the frame.

Aspects disclosed herein also describe restoration systems for video remastering. The systems comprise at least one processor and memory storing instructions. The instructions, when executed by the at least one processor, cause the processor to receive, by the system, a video sequence. For each frame of the video sequence, the instructions further cause the processor to encode, by a degradation encoder, a video content associated with the frame into a latent vector. The latent vector is a representation of the degradation present in the video content; the degradation present in the video content includes one or more degradation types. Then, to generate, by a backbone network, based on the latent vector and the video content, one or more feature maps, and to restore, based on the one or more feature maps, the frame.

Further, aspects disclosed herein describe a non-transitory computer-readable medium comprising instructions executable by at least one processor to perform methods for video remastering by a restoration system. The methods comprise receiving, by the system, a video sequence. For each frame of the video sequence, the methods further comprise encoding, by a degradation encoder, a video content associated with the frame into a latent vector. The latent vector is a representation of the degradation present in the video content; the degradation present in the video content includes one or more degradation types. Then, generating, by a backbone network, based on the latent vector and the video content, one or more feature maps, and, restoring, based on the one or more feature maps, the frame.

FIG. 1 is a block diagram of an example device 100, based on which one or more features of the disclosure can be implemented. The device 100 can be, for example, a computer, a gaming device, a handheld device, a set-top box, a television, a mobile phone, or a tablet computer. The device 100 includes a processor 102, an accelerated processing unit (APU) 104, memory 106, storage 116, an input device 108, and an output device 110. The device 100 can also include an input driver 112 and an output driver 114. In an aspect, the device 100 can include additional components not shown in FIG. 1.

The processor 102 can include a central processing unit (CPU) or one or more cores of CPUs. The APU 104 can represent a highly parallel processing unit, a graphics processing unit (GPU), or a combination thereof. The processor 102 and the APU 104 may be located on the same die or on separate dies. The memory 106 can be located on the same die as the processor 102, or can be located separately from the processor 102. The memory 106 can include volatile or non-volatile memory, for example, random access memory (RAM), dynamic RAM (DRAM), a cache, or a combination thereof.

The storage 116 can include fixed or removable storage, for example, a hard disk drive, a solid-state drive, an optical disk, or a flash drive. The input device 108 can represent one or more input devices, such as a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 110 can represent one or more output devices, such as a display, a speaker, a printer, a haptic feedback device, one or more lights, an antenna, or a network connection (e.g., a wireless local area network card for transmission of wireless IEEE 802 signals).

The input driver 112 communicates with the processor 102 and the input device 108, and facilitates the receiving of input from the input device 108 to the processor 102. The output driver 114 communicates with the processor 102 and the output device 110, and facilitates the sending of output from the processor 102 to the output device 110. In an aspect, the input driver 112 and the output driver 114 are optional components, and the device 100 can operate in the same manner when the input driver 112 and the output driver 114 are not present.

The APU 104 can be configured to accept compute (dispatch) commands and graphics (draw) commands from processor 102, to process those compute and graphics rendering commands, and/or to provide output to a display (output device 110). As described in further detail below, the APU 104 can include one or more parallel processing units configured to perform computations, for example, in accordance with a single instruction multiple data (SIMD) paradigm. A SIMD paradigm is one in which the same one or more instructions (associated with a computational task) are applied in parallel to different data elements.

Figure 2:
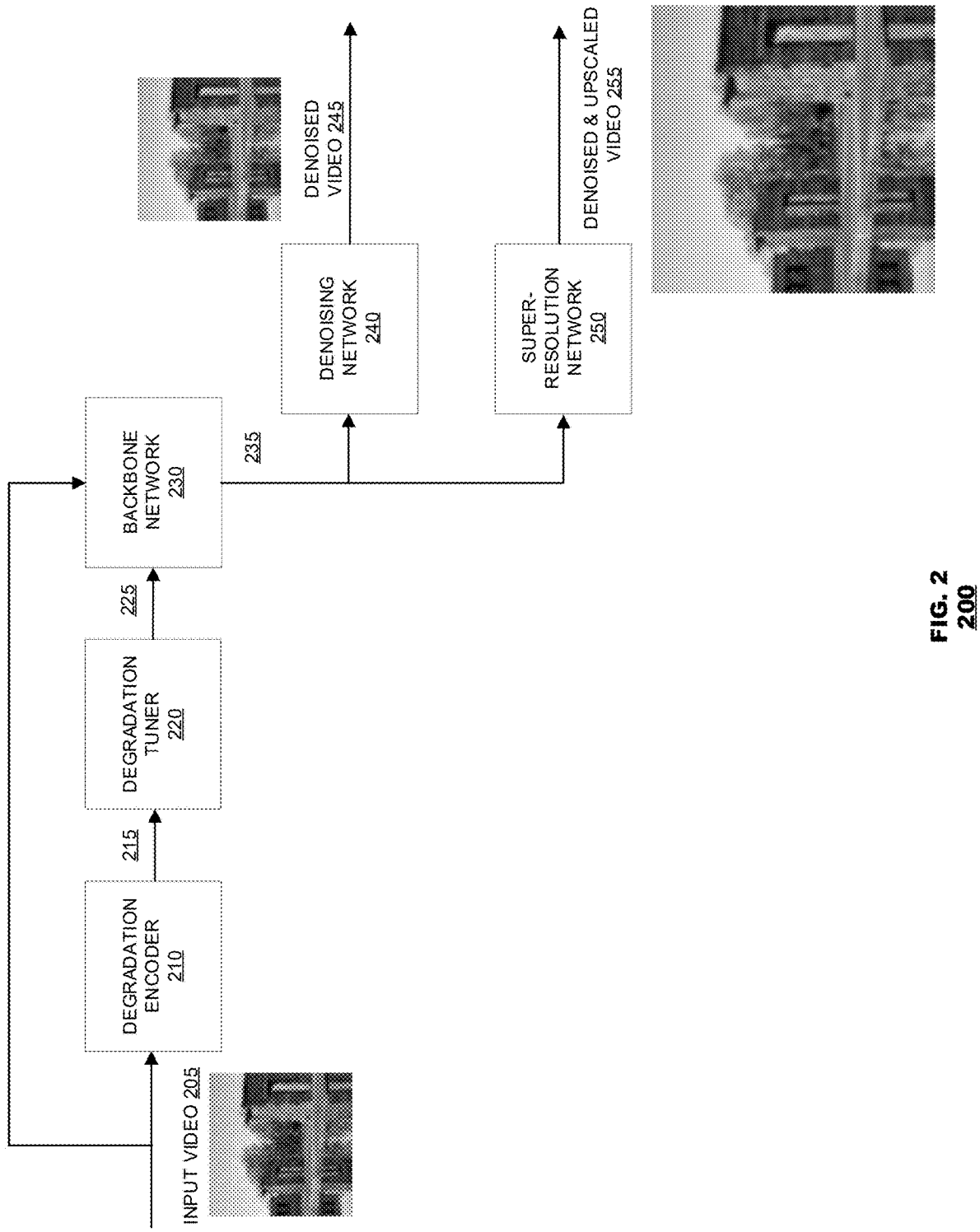
FIG. 2 is a functional block diagram of an example system for video remastering, based on which one or more features of the disclosure can be implemented.

FIG. 2 is a functional block diagram of an example system 200 for video remastering, based on which one or more features of the disclosure can be implemented. The system 200 includes processing components, such as a degradation encoder 210, a degradation tuner 220, a backbone network 230, a denoising network 240, and a super-resolution network 250. The device 100 of FIG. 1 may be employed to implement the functions described herein with respect to the system's components 210, 220, 230, 240, 250. Modules associated with these components may be stored in memory 106, retrieved from storage 116, executed by one or more processors 102 or APU 104, and may be implemented by hardware, firmware, or software. Input (legacy) video 205 may be fed into the degradation encoder 210, from which a degradation representation (a latent vector) 215 may be encoded. Optionally, the encoded degradation representation 215 may be adjusted by the degradation tuner 220. Then, the (optionally adjusted) degradation representation 225 may be used by the backbone network 230 to generate one or more feature maps 235. To restore the input video 205, based on the feature maps 235, the denoising network 240 may generate a denoised version 245 of the input video 205, and the super-resolution network 250 may generate a denoised and upscaled version 255 of the input video 205. The backbone network 230 and the denoising and super-resolution networks 240, 250 may be part of a network architecture, starting with several shared layers-namely, a backbone network—that feed multiple heads of specialized networks. Hence, the backbone network 230 may learn features that are beneficial for different restoration tasks (top-level features) and the heads may learn features that are beneficial for specific restoration tasks (low-level features), such as the denoising 240 and the super-resolution 250 restoration tasks.

To carry out the video restoration, the remastering system 200 may utilize a degradation model that is trained according to principles of contrastive learning. The degradation model may be used to remove (and, optionally, adjust) content degradation that is typically present in the video content of a legacy film, including, for example, scratches, noise, and implicit blur that may exist in low-resolution films. A degradation model may be formulated as follows:

$$y = S \cdot ((x*k)\downarrow_s + n), \quad (1)$$

where, y is a low-resolution degraded input video to be restored into a high-resolution output video x. As modeled, x (a ground-truth of the output video) is first degraded by a blurring operation, employed by a convolution (denoted by *) with a blur kernel k, and, then, by a down-sampling operation (denoted by $\downarrow$) by a factor s. The output video x is further degraded by adding noise, n, followed by a scratching operation (denoted by $\cdot$). The scratching may be employed by a mask S that sets the values of randomly selected pixels in the degraded video $((x*k)\downarrow_s + n)$ to 0. Based on such a model and based on contrastive learning principles, the degradation encoder 210 may be trained to produce a latent vector 215 that discriminatively characterizes the degradation present in an input video y 205. Such a latent vector may then be used by the backbone network 230 to extract features (or one or more feature maps) 235. Feature maps 235 generated by the backbone network 230 may then be used to generate both a low-resolution denoised video 245 by the denoising network 240 and a denoised and up-scaled video 255 by the super-resolution network 250, as illustrated by the system 200 of FIG. 2. Additionally, degradation parameters-such as the modeled blur kernel k and the additive noise n—can be decoded from the latent vector and can be used, by the degradation tuner 220, to adjust the resulting restored video 245, 255, as further discussed below.

Figure 3:
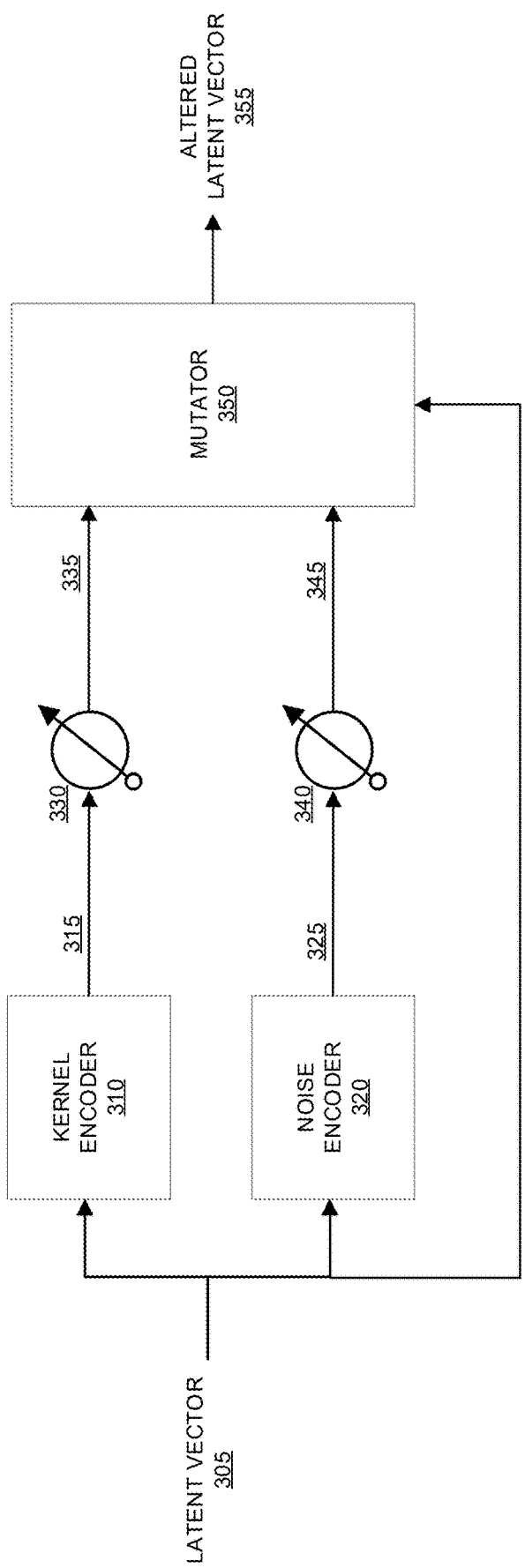
FIG. 3 is a functional block diagram of an example system for tuning video restoration, based on which one or more features of the disclosure can be implemented.

FIG. 3 is a functional block diagram of an example system 300 for tuning video restoration, based on which one or more features of the disclosure can be implemented. The system 300 may be employed by the degradation tuner 220 of FIG. 2 to artistically adjust the blurring and the level of noise in the restored video 245, 255. The system 300 may include a kernel encoder 310, a noise encoder 320, respective adjusters 330, 340, and a mutator 350. The kernel encoder 310 and the noise encoder 320 may be trained to generate, based on a latent vector 305, estimates for the degradation parameters—that is, a blur kernel estimate $\hat{k}$ 315 and a noise estimate $\hat{n}$ 325, respectively. The training of the kernel encoder 310 and the noise encoder 320 is further described in reference to FIG. 5. The adjusters 330, 340 may represent any means by which the generated blur kernel estimate 315 or noise estimate 325 may be tuned, resulting in an adjusted blur kernel 335 or an adjusted noise level 345. For example, the adjusters 330, 340 may represent a graphical user interface with which a user may tune the blur kernel estimate 315 or the noise estimate 325. The mutator 350 is trained to generate, out of the adjusted degradation parameters 335, 345, a corresponding altered latent vector 355. The training of the mutator 350 is further described in reference to FIG. 6. The altered latent vector 355 (that is, the output 225 of the degradation tuner 220) may then be used in lieu of the latent vector 215 by the backbone network 230 of the remastering system 200 of FIG. 2.

As disclosed herein, the degradation encoder 210 is configured to learn to extract, from the content of the input video 205, degradation representations (latent vectors) that are discriminative. That is, two latent vectors of similarly degraded respective video contents will be located in close proximity in the representation space, while two latent vectors of differently degraded respective video content will be located in remote proximity in the representation space. Furthermore, the discriminative nature of the representation space should not be content dependent—the training of the degradation encoder 210 should provide a clear decoupling between the video content and the degradation that may exist in the video. Thus, in training the degradation encoder 210, an important objective is to disentangle the degradation present in the training video samples from the content of those training video samples. The training of the degradation encoder 210 of FIG. 2 is further described in reference to FIG. 4.

Figure 4:
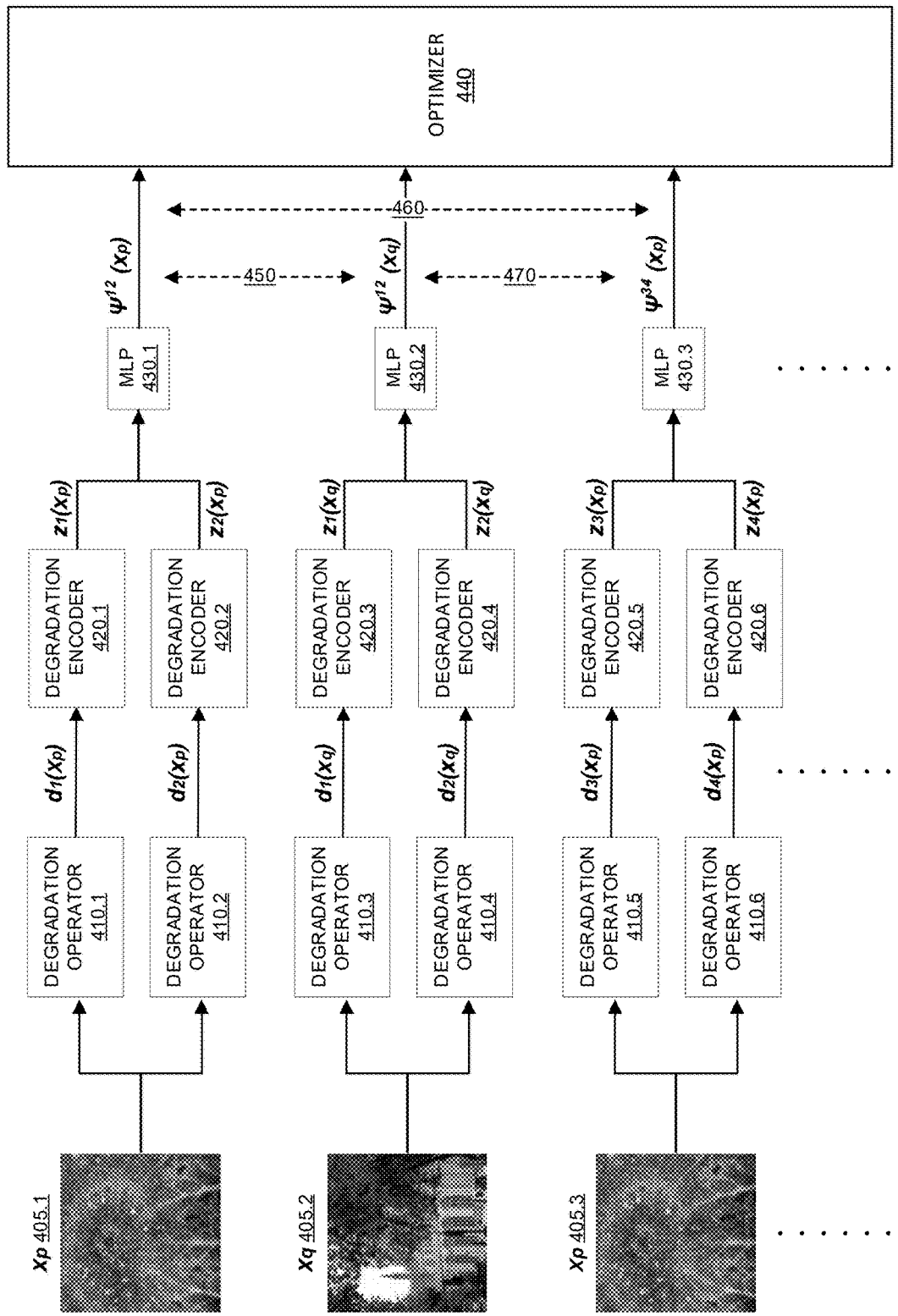
FIG. 4 is a functional block diagram of an example system for training a degradation encoder, based on which one or more features of the disclosure can be implemented.

FIG. 4 is a functional block diagram of an example system 400 for training the degradation encoder 210, based on which one or more features of the disclosure can be implemented. The training of the encoder 210 may be carried out using a set V of training videos from which training samples may be extracted. For example, a training sample extracted from a video $x_p$ may be a video content (also referred to herein as an image content) that is associated with a frame of the video $x_p$ (for simplicity, such a training sample is referred to herein as $x_p$). The extracted training samples may be degraded by a wide range of degradations, defined as follows. A set D of degradations: $d_i \in D$ may be formed, parametrized by blur kernels $k_i$ and noise levels $n_i$. Accordingly, degrading a training sample $x_p$ by degradation $d_i$ results in a respective degraded sample $y_p^i$, in accordance with $$y_p^i = d_i(x_p) = x_p * k_i + n_i.$$

Encoding the degraded sample $y_p^i$ by the encoder 210, denoted $E_d$, results in a latent vector $$z_p^i = E_d(y_p^i).$$

In training the network parameters of $E_d$, learning is focused on generating latent vectors that discriminately represent degradations that are applied to respective training samples, as further disclosed below.

Training video samples are typically captured with different camera exposure levels, by sensors of various resolutions, that output images with various additive noise levels. Therefore, these samples already contain inherent degradation before the application of the additional degradation (e.g.

$$(\text{e.g., } y_p^j = d_i(x_p)).$$

). Separating between these two sources of degradation (the inherent and the applied ones) is an ill-posed problem. Therefore, as disclosed herein, the degradation encoder 210 is trained by pairs of degraded video samples, where each pair is produced by a video sample that is degraded differently. By doing so, the learning is focused on differences between degradations introduced to video samples during the training (the applied degradations), rather than focusing on differences between degradations already present in the video samples (the inherent degradations).

Accordingly, to train the encoder 210, two pairs of degradations are sampled from D, for example, $(d_i, d_j)$ and $(d_k, d_l)$, and a pair of videos $x_p$ and $x_q$ are sampled from a training video set. Then, the two pairs of degradations are applied to the pair of videos, and, then, the degraded videos are encoded, as follows:

$$x_p \to (d_i(x_p), d_j(x_p)) \to (y_p^i, y_p^j) \to (E_d(y_p^i), E_d(y_p^j)) \to (z_p^i, z_p^j), \quad (2)$$

$$x_q \to (d_i(x_q), d_j(x_q)) \to (y_q^i, y_q^j) \to (E_d(y_q^i), E_d(y_q^j)) \to (z_q^i, z_q^j), \quad (3)$$

$$x_p \to (d_k(x_p), d_l(x_p)) \to (y_p^k, y_p^l) \to (E_d(y_p^k), E_d(y_p^l)) \to (z_p^k, z_p^l). \quad (4)$$

Note that the pairs $(z_p^i, z_p^j)$ and $(z_q^i, z_q^j)$ are obtained by degrading two different videos $x_p$ and $x_q$, respectively, with the same pair of degradations $(d_i, d_j)$. Therefore, they form a positive example. The pairs $(z_p^k, z_p^l)$ and $(z_q^i, z_q^j)$ are obtained by degrading two different videos $x_p$ and $x_q$, with different pairs of degradations $(d_k, d_l)$ and $(d_i, d_j)$. Therefore, they form a negative example. And, the pairs $(z_p^i, z_p^j)$ and $(z_p^k, z_p^l)$ are obtained by degrading the same video $x_p$ with different pairs of degradations $(d_i, d_j)$ and $(d_k, d_l)$. Therefore, they form a hard-negative example. Positive, negative, and hard-negative examples are utilized herein to force a contrastive learning of latent vectors that focuses on differences in degradations, rather than differences in content.

FIG. 4 illustrates this process of generating encoded pairs of degraded video samples, in accordance with equations (2)-(4). To train the degradation encoder 210, samples of high-resolution video content 405, sampled from the set V of training videos, may be used. As illustrated, image content 405.1 of video $x_p$ is degraded by degradation operators 410.1 and 410.2, resulting in a pair of degraded content $d_i(x_p)$ and $d_2(x_p)$—degraded by a pair of degradations $d_i$ and $d_2$(sampled from the degradation set D), respectively. The pair of degraded content, $d_i(x_p)$ and $d_2(x_p)$, may then be subsampled and encoded 420.1, 420.2, resulting in a pair of latent vectors 21 $(x_p)$ and $z_2(x_p)$, in accordance with equation (2). Image content 405.2 of video $x_q$ is degraded by degradation operators 410.3 and 410.4, resulting in a pair of degraded content $d_1(x_q)$ and $d_2(x_q)$—degraded by the pair of degradations $d_1$ and $d_2$, respectively. The pair of degraded content, $d_1(x_q)$ and $d_2(x_q)$, may then be subsampled and encoded 420.3, 420.4, resulting in a pair of latent vectors $z_1(x_q)$ and $z_2(x_q)$, in accordance with equation (3). Image content 405.3 of video $x_p$ (same content as 405.1) is degraded by degradation operators 410.5 and 410.6, resulting in a pair of degraded content $d_3(x_p)$ and $d_4(x_p)$—degraded by a sampled pair of degradations $d_3$ and $d_4$, respectively. The pair of degraded content, $d_3(x_p)$ and $d_4(x_p)$, may then be subsampled and encoded 420.5, 420.6, resulting in a pair of latent vectors $z_3(x_p)$ and $z_4(x_p)$, in accordance with equation (4). In the same manner, pairs of latent vectors (in accordance with equations (2), (3), and (4)) may be generated from image content 405 sampled from the training video set V to be used in the training of the degradation encoder 210, as further disclosed below.

The degradation encoder 210 may be trained based on contrastive learning. To that end, a MoCo framework may be used, where encoded pairs of degraded samples, $(z_p^i, z_p^j)$, $(z_q^i, z_q^j)$, and $(z_p^k, z_p^l)$, are concatenated and fed into multilayer perceptron (MLP) projection heads 430, denoted F, as follows:

$$\psi_p^{ij} = F(z_p^i, z_p^j), \psi_q^{ij} = F(z_q^i, z_q^j), \text{ and } \psi_p^{kl} = F(z_p^k, z_p^l). \quad (5)$$

In a contrastive learning, the objective is to optimize for $\psi_p^{ij}$ and $\psi_q^{ij}$ that are similar, since they share the same degradation (in spite of the different video contents) and to optimize for $\psi_p^{ij}$ and $\psi_p^{kl}$ that are dissimilar, since they do not share the same degradations. To achieve that objective, a cost metric $\mathcal{L}_c$ is minimized 440, such as the InfoNCE loss function that is defined as follows:

$$\mathcal{L}_c = \sum_{p,q}^{V} \sum_{i,j}^{D} -\log \frac{e^{(\psi_p^{ij} \cdot \psi_q^{ij}/\tau)}}{e^{(\psi_p^{ij} \cdot \psi_p^{kl}/\tau)} + \sum_{t=1}^{N} e^{(\psi_p^{ij} \cdot \psi_t/\tau)}} \quad (6)$$

where N is the number of samples in the MoCo queue, V is the set of training videos from which image contents 405 are sampled, D is the set of degradations, t is a temperature parameter, and the operator "·" denotes the dot product between two vectors. The metric $\mathcal{L}_c$ may be minimized 440, for example, by applying gradient descent optimization techniques.

As mentioned above, positive, negative, and hard-negative examples may be used for contrastive learning. As illustrated in FIG. 4, latent vectors $\psi_p^{12}$ and $\psi_q^{12}$ (outputs of MLP 430.1 and 430.2, respectively) form a positive example 450, latent vectors $\psi_q^{12}$ and $\psi_p^{34}$ (outputs of MLP 430.2 and 430.3, respectively) form a negative example 470, and latent vectors $\psi_p^{12}$ and $\psi_p^{34}$ (outputs of MLP 430.1 and 430.3, respectively) form a hard-negative example 460. These examples are fed into the optimizer 440. The network parameters of the degradation encoder Ea 210 may be learned by an optimization process, employed by the optimizer 440. That is, by minimizing the cost metric $\mathcal{L}_c$ (e.g., the InfoNCE loss function of equation (6)).

Figure 5:
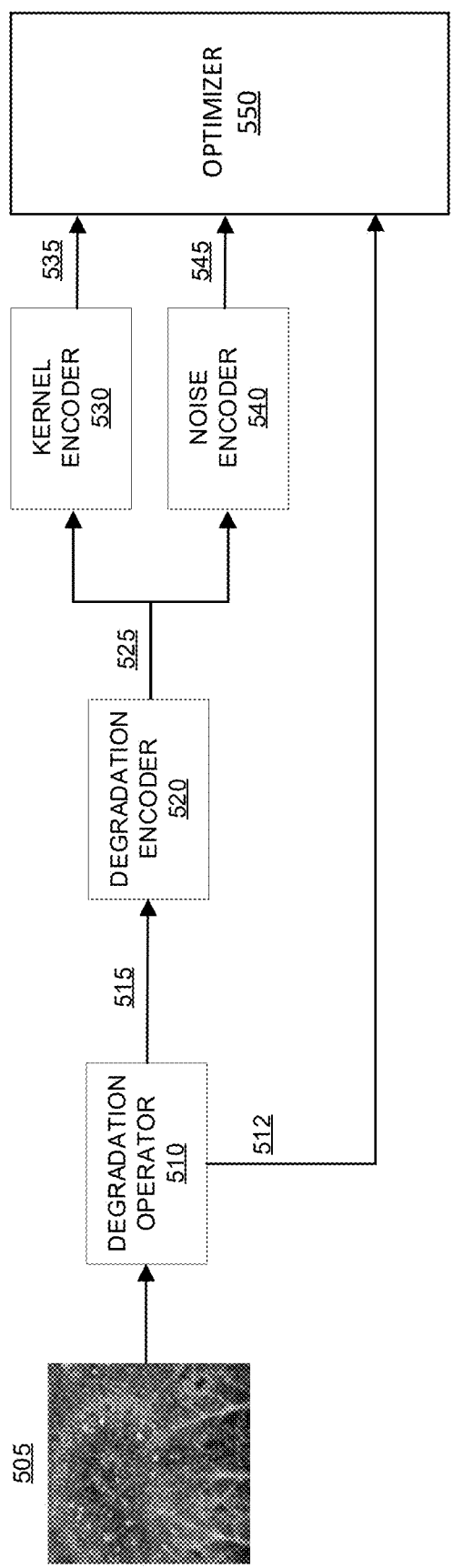
FIG. 5 is a functional block diagram of an example system for training a blur kernel encoder and a noise encoder, based on which one or more features of the disclosure can be implemented.

FIG. 5 is a functional block diagram of an example system 500 for training a blur kernel encoder and a noise encoder, based on which one or more features of the disclosure can be implemented. FIG. 5 illustrates the training of the kernel encoder 310 and the noise encoder 320 that may be used for refining the restored video output 245, 255, as described in reference to FIG. 2 and FIG. 3. The system 500 includes a degradation operator 510 that degrades samples of image content 505, $x_p$, sampled from the set V of training videos, according to respective degradations, $d_i$, sampled from the set D of degradations. Degraded samples 515 may then be fed into a degradation encoder 520 (trained as described in reference to FIG. 4). Then, the encoded samples 525, $E_d(d_i(x_p))$, may be used for the training of a kernel encoder 530, denoted $E_k$, and a noise encoder 540, denoted $E_n$. To that end, the encoders 530, 540 (e.g., implemented by MLPs) are trained by optimizing 550 respective cost functions, such as cost functions $\mathcal{L}_k$ and $\mathcal{L}_n$:

$$\mathcal{L}_k = \sum_p^V \sum_i^D |E_k(E_d(d_i(x_p))) - k_i| \quad (7)$$

$$\mathcal{L}_n = \sum_p^V \sum_i^D |E_n(E_d(d_i(x_p))) - n_i| \quad (8)$$

Thus, the encoded samples $E_d(d_i(x_p))$ 525 are supplied to the encoders $E_k$ and $E_n$ and respective outputs $E_k(E_d(d_i(x_p)))$ and $E_n E_d(d_i(x_p))$ are trained to match the respectively applied distortion parameters 512, that is, the blur kernel $k_i$ and the noise $n_i$.

In an aspect, the training of the degradation encoder 210, 420, $E_d$, the kernel encoder 310, 530, $E_k$, and the noise encoder 320, 540, $E_n$, may be carried out concurrently by optimizing the cost functions in equations (6)-(8) jointly:

$$\mathcal{L} = \lambda_c \mathcal{L}_c + \lambda_k \mathcal{L}_k + \lambda_n \mathcal{L}_n \quad (9)$$

where $\lambda_c, \lambda_k, \lambda_n$ weigh the respective contributions of $\mathcal{L}_c$, $\mathcal{L}_k$, and $\mathcal{L}_n$ to the overall cost function $\mathcal{L}$ (e.g., $\lambda_c=1$, $\lambda_k=400$, $\lambda_n=1$).

Figure 6:
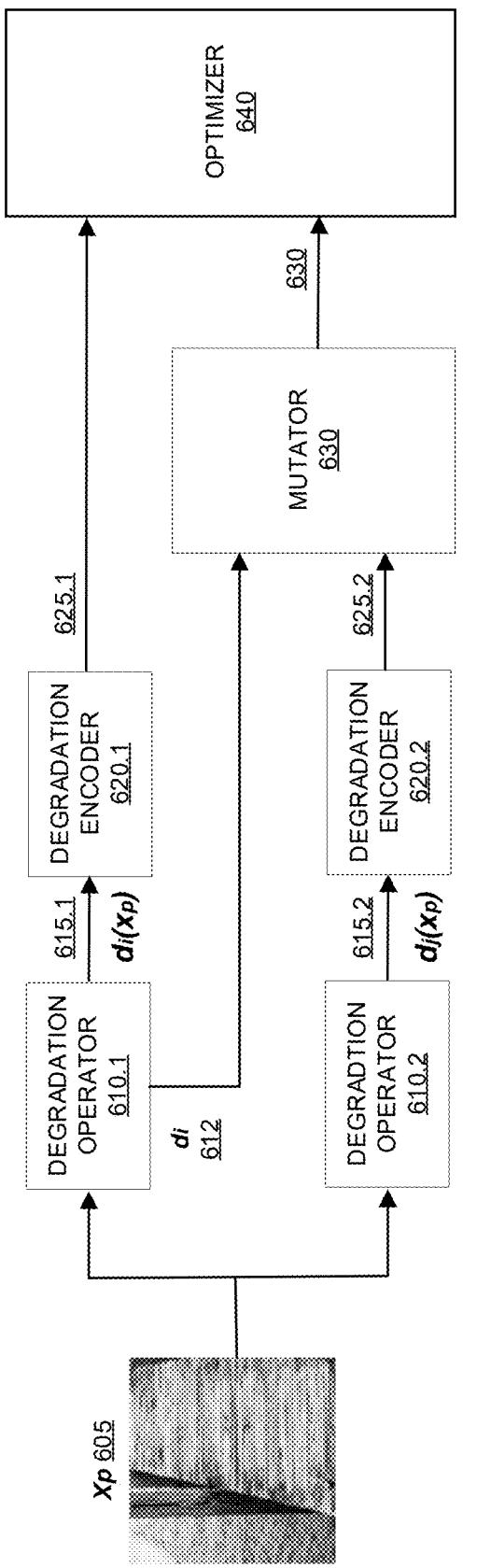
FIG. 6 is a functional block diagram of an example system for training a mutator, based on which one or more features of the disclosure can be implemented.

FIG. 6 is a functional block diagram of an example system 600 for training a mutator, based on which one or more features of the disclosure can be implemented. The mutator 630 is trained to provide fine-grained control over the process of restoring a degraded video 205. Once trained, the mutator 330 can be used by the degradation tuner 220 to artistically adjust the blurring and the noise level in the restored video 245, 255 (as discussed in reference to FIG. 3). As illustrated by FIG. 6, high-resolution image content 605, $x_p$, sampled from the set V of training videos, is degraded 610.1, according to degradation $d_i$, resulting in degraded content 615.1 $d_i(x_p)$. Similarly, the high-resolution image content 605, $x_p$, is degraded 610.2, according to degradation $d_j$, resulting in degraded content 615.2 $d_j(x_p)$. Then, both degraded contents are subsampled and encoded by encoders 620.1 and 620.2, into latent vector $$z_p^i = E_d(d_i(x_p))$$

625.1 and latent vector $$z_p^j = E_d(d_j(x_p))$$

625.2 respectively. The mutator 630 is trained to provide a latent vector 630 that corresponds to new parameters $k_i$ and $n_i$ (of $d_i$ 612) that deviate from parameters $k_j$ and $n_j$, to which the latent vector 625.2 corresponds. Accordingly, the training of the mutator 630 is performed by optimizing 640 the cost function $\mathcal{L}_m$, as follows:

$$\mathcal{L}_m = \sum_p^V \sum_{i,j}^D |M(z_p^j, k_i, n_i) - z_p^i| \quad (10)$$

Hence, the mutator 630 (or 350), when presented with an adjusted degradation parameter 612 (or 335, 345) and a current latent vector 625.2 (or 305), is trained to produce an altered latent vector 630 (or 355) that matches a latent vector 625.1 that represents a degradation 615.1 that is present in a video content when the video content is degraded by the adjusted degradation parameter 612.

As illustrated in FIG. 2, the remastering system 200 receives as an input a corrupted (degraded) video $y_p$ to be restored. Image contents representing consecutive frames of $y_p$ are encoded 210, resulting in corresponding representations of the degradation present in the video. For example, for each frame of $y_p$, the degradation encoder 210 may generate a respective latent vector that discriminatively represents the degradation that may exist in image content corresponding to that frame. As described above, if desired, that latent vector may be adjusted by the degradation tuner 220. The (optionally adjusted) latent vector may then be used by the backbone network 230, denoted $R_B$, for conditioning the restoration performed by the denoising network 240, denoted $R_{DN}$, and the super-resolution network 250, denoted $R_{SR}$. In an aspect, the $R_{DN}$ and the $R_{SR}$ networks are task-specific networks that branch from a shared $R_B$ network. In this way, feature maps, generated by the $R_B$ network, can be simultaneously learned for different restoration tasks, while features specific for denoising and super-resolution can be learned by the $R_{DN}$ and the $R_{SR}$ networks, respectively.

Hence, a restoration process begins by encoding a corrupted input $y_p$ into a latent vector $$E_d(y_p^i).$$

Then, both the corrupted video $y_p$ and the latent vector $$E_d(y_p^i)$$

are restoration backbone $R_B$ 230, based on which the restoration backbone may generate feature maps. These feature maps are fed into the denoising network $R_{DN}$ and the super-resolution network $R_{SR}$. Thus, two outputs can be produced by the system 200. A first output is the denoised low-resolution video 245 (that is, an estimate of the original low-resolution video), generated by the denoising network $R_{DN}$ 240. A second output is the denoised high-resolution video 255, generated by the super-resolution network $R_{SR}$ 250. To generate the two outputs, the system 200 may first remove scratches that may be present in the video $y_p$. Thus, during training, the networks $R_{SR}$ and $R_{DN}$ may be trained to minimize the cost functions $\mathcal{L}_{SR}$ and $\mathcal{L}_{DN}$, as follows:

$$\mathcal{L}_{SR} = \sum_p^V \sum_i^D |R_{SR}(E_d(y_p^i), y_p^i) - \hat{x}_p| \quad (11)$$

$$\mathcal{L}_{DN} = \sum_p^V \sum_i^D |R_{DN}(E_d(y_p^i), y_p^i) - (\hat{x}_p * k_i) \downarrow_s|. \quad (12)$$

Where, $$R_{SR}(E_d(y_p^i), y_p^i)$$

is the output of super-resolution network 250 that is optimized to match $\hat{x}_p$, an enhanced version of $x_p$ (the high-resolution ground-truth video). The enhancement may be implemented by a filter, for example, to sharpen the content of $x_p$.

$$R_{DN}(E_d(y_p^i), y_p^i)$$

is the output of the denoising network 240 that is optimized to match $(\hat{x}_p * k_i) \downarrow_s$, a down-sampled version of $\hat{x}_p$ (generated by first blurring $\hat{x}_p$ by a blur kernel $k_i$ and, then, down-sampling by a scale s).

In an aspect, the models disclosed herein may be fine-tuned jointly by optimizing the parameters of the respective networks. Thus, the cost function £ of equation (9) can be extended as follows:

$$\mathcal{L} = \lambda_{SR}\mathcal{L}_{SR} + \lambda_{DN}\mathcal{L}_{DN} + \lambda_c\mathcal{L}_c + \lambda_k\mathcal{L}_k + \lambda_n\mathcal{L}_n \quad (13)$$

Where $\lambda_{SR}$, $\lambda_{DN}$, $\lambda_c$, $\lambda_k$, and $\lambda_n$ weigh the respective contributions of $\mathcal{L}_{SR}$, $\mathcal{L}_{DN}$, $\mathcal{L}_c$, $\mathcal{L}_k$, and $\mathcal{L}_n$ to the overall cost function $\mathcal{L}$ (e.g., $\lambda_{SR}=1$, $\lambda_{DN}=1$, $\lambda_c=1$, $\lambda_k=400$, $\lambda_n=1$).

Figure 7:
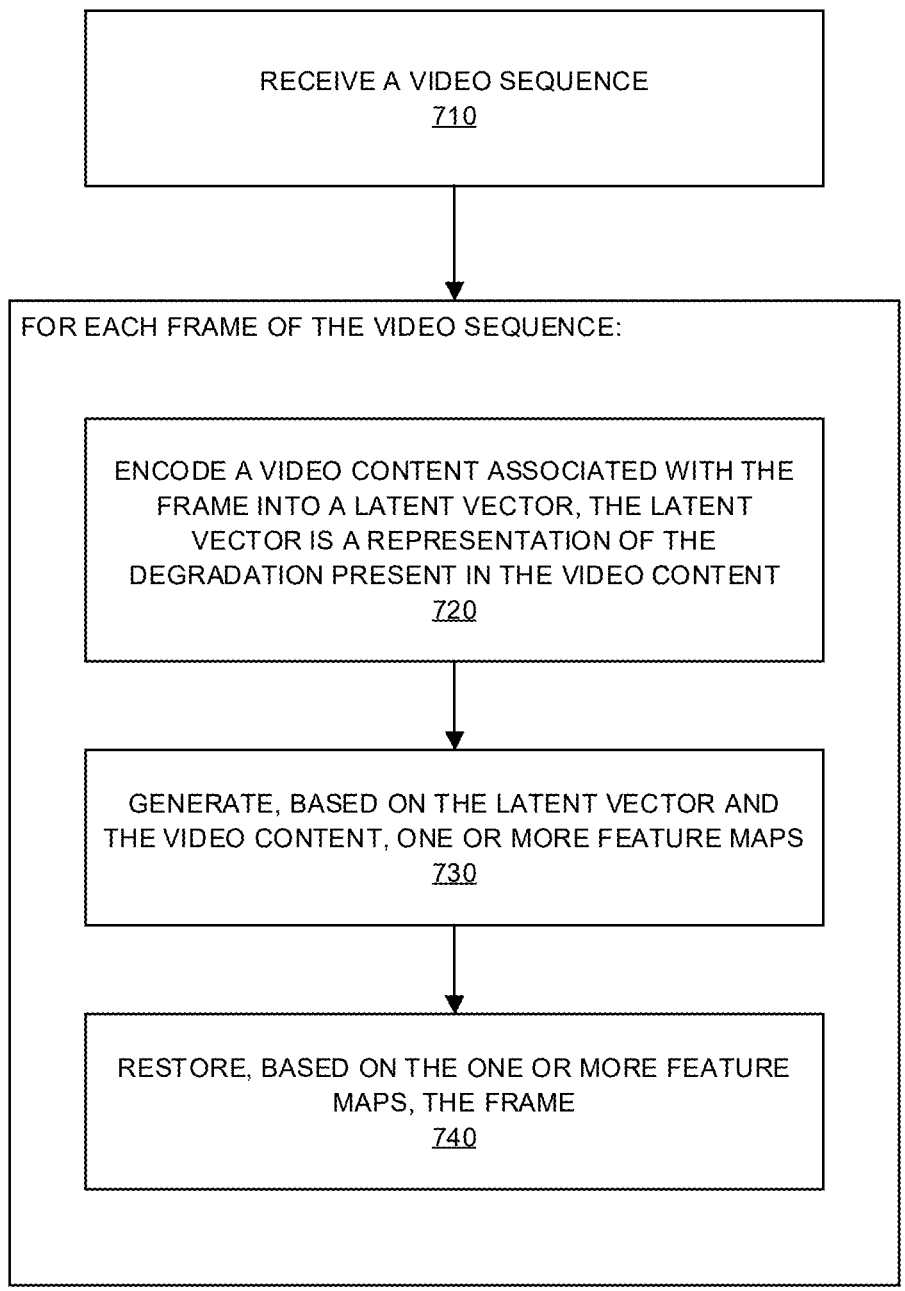
FIG. 7 is a flowchart of an example method for video remastering, based on which one or more features of the disclosure can be implemented.

FIG. 7 is a flowchart of an example method 700 for video remastering, based on which one or more features of the disclosure can be implemented. The method 700 may begin with receiving, by the system 200, a video sequence, in step 710. The video sequence may be degraded by one or more degradation types (e.g., scratches, noise, or blur). Then, for each frame of the video sequence, the method 700 may employ a process for restoring the frame, as follows. In step 720, a video content associated with a frame of the video sequence 205 may be encoded, by a degradation encoder 210, into a latent vector. A video content associated with a frame may be an image content from the frame or an image content from frames within a temporal neighborhood centered at that frame, where the image content may be derived from one or more channels of a frame or a frame region, for example. The latent vector is a representation of the degradation present in the video content-a degradation which may include one or more degradation types. In step 730, one or more feature maps may be generated by a backbone network 230 based on the latent vector and the video content associated with the frame. And, in step 740, the frame is restored based on the one or more feature maps. In an aspect, the frame may be restored by a denoising network 240, resulting in a denoised frame. In another aspect, the frame may be restored by a super-resolution network 250, resulting in a denoised frame at a higher resolution frame.

Further, according to the method 700, for each frame of the video sequence, the latent vector may be tuned 220 and the generation of the one or more feature maps may be based on the tuned latent vector. In an aspect, the tuning may be performed by estimating, based on the latent vector, a degradation parameter (such as the blur kernel and noise level); adjusting the estimate of the degradation parameter; and tuning, based on the adjusted estimates of the degradation parameter, the latent vector (e.g., as described in reference to FIG. 3). The degradation parameter may be estimated by training a degradation parameter encoder (e.g., kernel encoder 530 and noise encoder 540, as described in reference to FIG. 5). The tuning of the latent vector may be done by altering the latent vector by a mutator 350, where the mutator may be trained to produce an altered latent vector that matches a latent vector that represents a degradation that is present in a video content when the video content is degraded by the adjusted estimate of the degradation parameter (e.g., as described in reference to FIG. 6).

It should be understood that many variations are possible based on the disclosure herein. The techniques disclosed herein for restoring degraded input video are not limited to removal of scratches, denoising, and upscaling the input video. Rather, the disclosed techniques can be similarly applied to other types of video degradations, such as those caused by video compression and interlacing operations. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor. Examples of a non-transitory computer-readable medium include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for video remastering by a restoration system, comprising:
    receiving, by the system, a video sequence; and
    for each frame of the video sequence,
        encoding, by a degradation encoder, a video content associated with the frame into a latent vector, the latent vector is a representation of a degradation present in the video content, the degradation includes one or more degradation types,
        tuning the latent vector,
        generating, by a backbone network, based on the tuned latent vector and the video content, one or more feature maps, and
        restoring, based on the one or more feature maps, the frame.

2. The method of claim 1, wherein the restoring comprises:
    restoring, by a denoising network, the frame into a denoised frame.

3. The method of claim 1, wherein the restoring comprises:
    restoring, by a super-resolution network, the frame into a denoised frame at a higher resolution frame.

4. A method for video remastering by a restoration system, comprising:
    receiving, by the system, a video sequence; and
    for each frame of the video sequence,
        encoding, by a degradation encoder, a video content associated with the frame into a latent vector, the latent vector is a representation of a degradation present in the video content, the degradation includes one or more degradation types,
        generating, by a backbone network, based on the latent vector and the video content, one or more feature maps, and
        restoring, based on the one or more feature maps, the frame;
    wherein the degradation encoder is trained based on pairs of degraded video contents, wherein each of the pairs includes video content that is degraded by a first degradation and a second degradation.

5. The method of claim 4, wherein the degradation encoder is further trained based on hard-negative examples, wherein a hard-negative example includes two pairs, of the pairs, one pair having a video content that is degraded according to a first and a second degradations and a second pair having the same video content that is degraded according to a different first and second degradations.

6. The method of claim 4, further comprising:
    for each frame of the video sequence,
        tuning the latent vector, wherein the generating is based on the tuned latent vector.

7. The method of claim 1, wherein the tuning comprises:
    estimating, based on the latent vector, a degradation parameter;
    adjusting the estimate of the degradation parameter; and
    tuning, based on the adjusted estimate of the degradation parameter, the latent vector.

8. The method of claim 7, wherein the degradation parameter is at least one of a blur kernel or a noise level.

9. The method of claim 7, wherein the estimating of the degradation parameter comprises:
    training a degradation parameter encoder to predict the degradation parameter, wherein:
        video content samples are degraded according to corresponding samples of degradation parameters,
        the degraded video content samples are encoded by the degradation encoder, resulting in respective latent vectors, and
        the difference between predictions of degradation parameters, predicted based on the respective latent vectors, and the corresponding samples of degradation parameters is minimized.

10. The method of claim 9, wherein the degradation encoder and the degradation parameter encoder are jointly trained.

11. The method of claim 7, wherein the tuning of the latent vector further comprises:
    altering the latent vector by a mutator, wherein the mutator is trained to produce an altered latent vector that matches a latent vector that represents a degradation that is present in a video content when the video content is degraded by the adjusted estimate of the degradation parameter.

12. A restoration system for video remastering, comprising:
at least one processor; and
memory storing instructions that, when executed by the at least one processor, cause the processor to:
receive, by the system, a video sequence, and
for each frame of the video sequence,
encode, by a degradation encoder, a video content associated with the frame into a latent vector, the latent vector is a representation of a degradation present in the video content, the degradation includes one or more degradation types,
tune the latent vector,
generate, by a backbone network, based on the tuned latent vector and the video content, one or more feature maps, and
restore, based on the one or more feature maps, the frame.

13. The system of claim 12, wherein the restoring comprises:
restoring, by a denoising network, the frame into a denoised frame.

14. The system of claim 12, wherein the restoring comprises:
restoring, by a super-resolution network, the frame into a denoised frame at a higher resolution frame.

15. A restoration system for video remastering, comprising:
at least one processor; and
memory storing instructions that, when executed by the at least one processor, cause the processor to:
receive, by the system, a video sequence, and
for each frame of the video sequence,
encode, by a degradation encoder, a video content associated with the frame into a latent vector, the latent vector is a representation of a degradation present in the video content, the degradation includes one or more degradation types,
generate, by a backbone network, based on the latent vector and the video content, one or more feature maps, and
restore, based on the one or more feature maps, the frame;
wherein the degradation encoder is trained based on pairs of degraded video contents, wherein each of the pairs includes video content that is degraded by a first degradation and a second degradation.

16. The system of claim 15, wherein the degradation encoder is further trained based on hard-negative examples, wherein a hard-negative example includes two pairs, of the pairs, one pair having a video content that is degraded according to a first and a second degradations and a second pair having the same video content that is degraded according to a different first and second degradations.

17. The system of claim 15, further comprising:
for each frame of the video sequence,
tuning the latent vector, wherein the generating is based on the tuned latent vector.

18. The system of claim 12, wherein the tuning comprises:
estimating, based on the latent vector, a degradation parameter;
adjusting the estimate of the degradation parameter; and
tuning, based on the adjusted estimate of the degradation parameter, the latent vector.

19. The system of claim 18, wherein the degradation parameter is at least one of a blur kernel or a noise level.

20. A non-transitory computer-readable medium comprising instructions executable by at least one processor to perform a method for video remastering by a restoration system, the method comprising:
receiving, by the system, a video sequence; and
for each frame of the video sequence,
encoding, by a degradation encoder, a video content associated with the frame into a latent vector, the latent vector is a representation of a degradation present in the video content, the degradation includes one or more degradation types,
tuning the latent vector,
generating, by a backbone network, based on the tuned latent vector and the video content, one or more feature maps, and
restoring, based on the one or more feature maps, the frame.

21. A method for training a degradation encoder of a restoration system for video remastering, comprising:
extracting samples of video content from a training video set;
degrading the samples of video content according to respective pairs of samples of degradation parameters, extracted from a training degradation set, resulting in pairs of degraded samples of video content; and
training the degradation encoder based on the pairs of degraded samples of video content, wherein the degradation encoder is trained to receive video content and to output a latent vector that represents a degradation present in the received video content, wherein the training comprises training the degradation encoder based on hard-negative examples, wherein each of the hard-negative example includes two pairs:
one pair having a video content sample, extracted from the training video set, that is degraded according to a first and a second degradation parameters, extracted from the training degradation set, and
a second pair having the same video content sample that is degraded according to a different first and second degradation parameters, extracted from the training degradation set.

22. A method for training a degradation parameter encoder of a restoration system for video remastering, comprising:
extracting samples of video content from a training video set;
degrading the samples of video content according to respective samples of degradation parameters, extracted from a training degradation set;
encoding, by a degradation encoder, the degraded samples of video content, resulting in respective latent vectors, and
tuning the latent vectors,
training the degradation parameter encoder based on the tuned latent vectors and the respective samples of degradation parameters.

* * * * *